(12) United States Patent  
Matsumoto

(10) Patent No.: US 7,663,825 B2
(45) Date of Patent: Feb. 16, 2010

(54) LENS BARREL DEVICE AND IMAGE CAPTURE DEVICE

(75) Inventor: Kenichi Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 190 days.

(21) Appl. No.: 11/886,654

(22) PCT Filed: Mar. 24, 2006

(86) PCT No.: PCT/JP2006/306777

§ 371 (c)(1),
(2), (4) Date: Sep. 19, 2007

(87) PCT Pub. No.: WO2006/106896

PCT Pub. Date: Oct. 12, 2006

(65) Prior Publication Data

US 2009/0067069 A1    Mar. 12, 2009

(30) Foreign Application Priority Data

Mar. 31, 2005   (JP) ............................... 2005-104492

(51) Int. Cl.
*G02B 7/02* (2006.01)
(52) U.S. Cl. ....................... 359/826; 359/704; 359/824; 359/822
(58) Field of Classification Search ................. 359/425, 359/704, 822, 824, 826; 396/529, 72, 75, 396/79, 85
See application file for complete search history.

(56) References Cited

U.S. PATENT DOCUMENTS 6,507,705 B1 * 1/2003 Kasha ........................ 396/72

FOREIGN PATENT DOCUMENTS

| JP | 07-225333 | 8/1995 |
|----|-----------|--------|
| JP | 08-15593 | 1/1996 |
| JP | 08-29656 | 2/1996 |
| JP | 08-211278 | 8/1996 |
| JP | 09-80288 | 3/1997 |
| JP | 11-23941 | 1/1999 |
| JP | 2001-318298 | 11/2001 |
| JP | 2002-23037 | 1/2002 |
| JP | 2002-107601 | 4/2002 |
| JP | 2002-333565 | 11/2002 |
| JP | 2003-337273 | 11/2003 |
| JP | 2004-317864 | 11/2004 |
| JP | 2005-24670 | 1/2005 |
| JP | 2005-64887 | 3/2005 |
| JP | 2005-529371 | 9/2005 |
| JP | 2005-354866 | 12/2005 |

* cited by examiner

*Primary Examiner*—Joseph Martinez
(74) *Attorney, Agent, or Firm*—Rader, Fishman & Grauer PLLC

(57) ABSTRACT

A lens barrel device that includes optical parts holding frames, which hold optical parts so that the optical parts holding frames can linearly move in the optical axis directions, respectively, and an image capture device.

13 Claims, 6 Drawing Sheets

US 7,663,825 B2

LENS BARREL DEVICE AND IMAGE CAPTURE DEVICE

TECHNICAL FIELD

The present invention relates to a lens barrel device including supporting means for supporting at least two optical parts holding frames to hold optical parts such that the optical parts holding frames can move linearly in the optical axis direction respectively and an image capture device including such lens barrel device.

BACKGROUND ART

Patent Document 1, for example, discloses the type of lens barrel device. The Patent Document 1 discloses a lens barrel device that includes a plurality of movable lens. A lens barrel device disclosed in the Patent Document 1 is characterized in that "a lens barrel device includes a stationary barrel, a movable barrel moving in the optical axis direction, and a lens frame moving in the optical axis direction interlocked with the movable barrel, the stationary barrel includes a first cam inwardly protruded from an inner circumferential surface thereof, the movable barrel includes an opening portion including a second cam surface facing in the circumferential direction with a predetermined angle, and that the lens frame includes a plurality of cam followers engaged with the first cam in the circumferential direction, with the cam followers being engaged with the second cam at end portions in the circumferential direction".

According to the lens barrel device having the above configuration, it is expected that "since a structure to move a lens group used in the lens barrel can be achieved by decreasing the number of parts produced with integral molding of resin, an inexpensive lens barrel device can be produced with excellent assembly efficiency".

Further, Patent Document 2, for example, discloses another lens barrel device of this kind. The Patent Document 2 discloses a lens barrel device that can be used for a lens system of a video camera, or the like. The lens barrel device disclosed in the Patent Document 2 is characterized by "a lens barrel device, a lens disposed within the lens barrel device, a holding means for holding the lens, in which the holding means including a coil, a yoke disposed within the lens barrel device in response to the circumference of the holding means, a magnet disposed within the yoke to move the holding means within the lens barrel device, the magnet forming a linear actuator with the coil when the coil is conducted and a guide means for guiding the holding means of the lens along the lens barrel device by driving the linear actuator, the guide means located at the position inner side of the yoke, the magnet, and the coil in the radial direction".

According to the lens barrel device having the above configuration, it is expected that "external form of the lens barrel device can be simplified without externally providing the guide means of a guide shaft".

However, in the above-mentioned lens barrel device described in the Patent Document 1, while cam pins provided on a plurality of movable barrels holding respective lens groups are engaged with a plurality of cam grooves on a cam cylinder and allow the cam pins are caused to move along the respective cam grooves by rotating the cam cylinder, and thereby the movable barrel is caused to move in the optical axis direction; if the number of lens groups is increased, the number of barrels should increase to fit the lens groups into the respective barrels; thus, the lens barrel device will have complicated configuration since an external diameter of an entire lens barrel device increases. In addition, an optical design for lenses and mechanical design for as cam grooves should be compatible with one another, so that parts usually have complicated designs.

Moreover, when the lens barrel device received impact from the front thereof, such impact is immediately transmitted to the cam pins, so that the cam pins may be broken or disengaged from the cam grooves, or the grooves may collide with peripheral parts. Accordingly, the barrel holding the lens group may not move, or peripheral parts may be damaged. In addition, it may be difficult to secure impact-resistance against the lens barrel device.

Further, since the lens barrel device including numeral lens groups to move needs contact slide portions having the cam pins and the cam grooves, so that a large rotational torque is required to drive the lens barrel device; when the lens barrel device is driven, a motor of large torque is generally decelerated gear to rotate. However, if a large-sized motor and a gear box for decelerating gear are mounted on the lens barrel device, the lens barrel device may increase in size.

Moreover, in the lens barrel device disclosed in the Patent Document 2, while the linear actuator is driven to move a plurality of lens frames along the guide shafts in the optical axis direction, backlash may be observed between holes into which the guide shafts of a plurality of lens frames are inserted and the guide shafts, due to dimensional errors of respective parts such as lens frames and errors of mounting accuracy of parts. As a result, adjusting to eliminate backlash without affecting the control of lenses may be required, thereby decreasing operating efficiency.

Patent Document 1:
The Official Gazette of Unexamined Published Japanese Patent Application No. Hei-7-294793

Patent Document 2:
The Official Gazette of Unexamined Published Japanese Patent Application No. Hei-8-15593

The problem to be solved is that, when the cam grooves formed on the cam cylinder are engaged with the cam pins provided on the barrel holding the lens group, and the barrel holding the lens group is moved by rotating the cam cylinder, if the number of lens group is increases, the number of barrels should also increase to fit the lens groups into the barrels, so that the lens barrel device will have a complex design, and the external diameter of the lens barrel device will increase. Further, if the guide shafts support a plurality of lens frames such that the lens frames can move, backlash will be observed between the guide shafts and the guide holes of the lens frames. Accordingly, adjusting to eliminate backlash may be required, thereby decreasing operating efficiency.

DISCLOSURE OF THE INVENTION

The most important characteristic of the lens barrel device according to the present invention described as follows: a lens barrel device includes at least two optical parts holding, frames for holding optical parts and including a plurality of first guide grooves extended in optical axis directions of the optical parts and located in parallel to one another, a barrel having at least two optical parts holding frames arranged in the optical axis direction, housing at least two optical parts holding frames such that optical axes of the optical parts are converged on one point, and including a plurality of second guide grooves facing a plurality of first guide grooves, and a plurality of roller units including a plurality of rollers located between the first guide grooves and the second guide grooves and supporting at least two optical parts slidably holding frames at a plurality of places for the barrel, in which positions of a plurality of first guide grooves, a plurality of second guide grooves, and a plurality of roller units located between a plurality of first guide grooves and a plurality of second guide grooves are shifted in the circumferential directions of the optical parts between adjacent optical parts holding frames of at least two optical parts holding frames, so that a plurality of roller units are alternately fitted into a plurality of first guide grooves and a plurality of second guide grooves.

According to the lens barrel device of the present application, since a plurality of roller units slidably support at least two optical parts holding frames at a plurality of places and the positions of a plurality of first guide grooves and a plurality of second guide grooves and a plurality of roller units located therebetween are shifted in the circumferential directions of the optical parts between the adjacent optical parts holding frames, so that the roller units may be fitted into the respective guide grooves, when a plurality of optical parts holding frames are used, the external diameter of the lens barrel device may not be increased and hence the entire device can decrease in size. In addition, since the roller units and the first guide grooves of the adjacent optical parts holding frames can be alternately fitted into one another, the adjacent optical parts holding frames can mutually approach closely to obtain desired images.

Since a plurality of roller units support at least two optical parts holding frames such that at least two optical parts holding frames can move linearly in the optical axis direction and the positions of a plurality of first guide grooves and a plurality of second guide grooves and a plurality of roller units lying therebetween are shifted in the circumferential directions of the optical parts between the adjacent optical parts holding frames of at least two optical parts holding frames so that they may be alternately fitted into one another, the adjacent optical parts holding frames can approach one another more closely to thereby make it possible to obtain desired images and the lens barrel device in which miniaturization of the whole of the device can be realized can be realized by the simple structure.

BEST MODE FOR CARRYING OUT THE INVENTION

As shown in FIGS. 1 to 7, a lens barrel device 1 showing a barrel device according to an embodiment of the present invention includes a barrel 2 for supporting a plurality of lenses fixedly or movably, three lens moving portions 3A, 3B, 3C for supporting three lenses, three magnetic circuit portions 4A, 4B, 4C for applying magnetic force to the three lens moving portions 3A, 3B, 3C, a slide mechanism portion 5 for preventing the three lens moving portions 3A, 3B, 3C from rotating so that the three lens moving portions are supported to only move in the axial direction of the barrel 2, a control unit (not shown) for controlling movements of the respective lens moving portions 3A to 3C.

Figure 1:
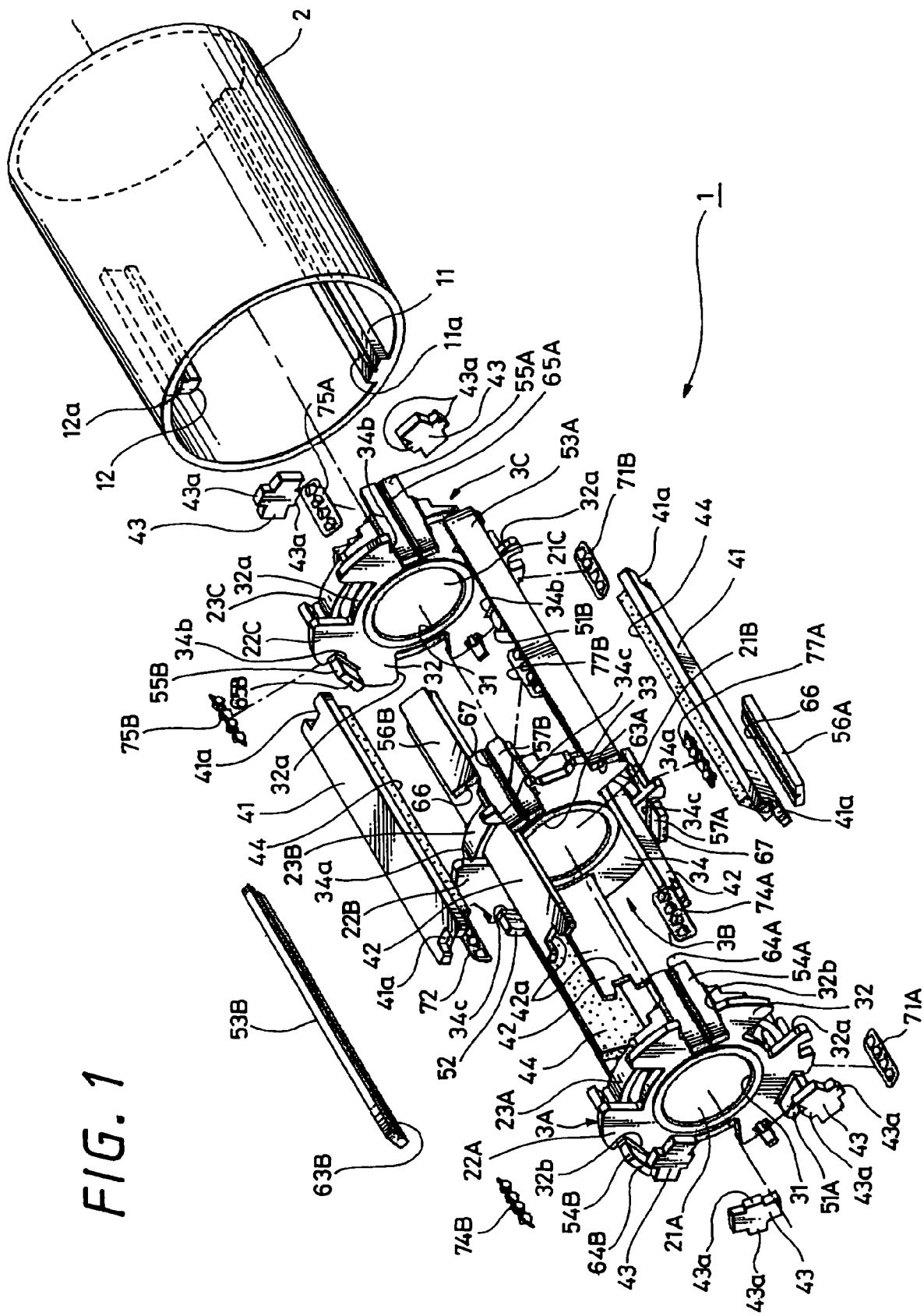
FIG. 1 is an exploded perspective view of a lens barrel device showing a barrel device according to an embodiment of the present invention.
Figure 2:
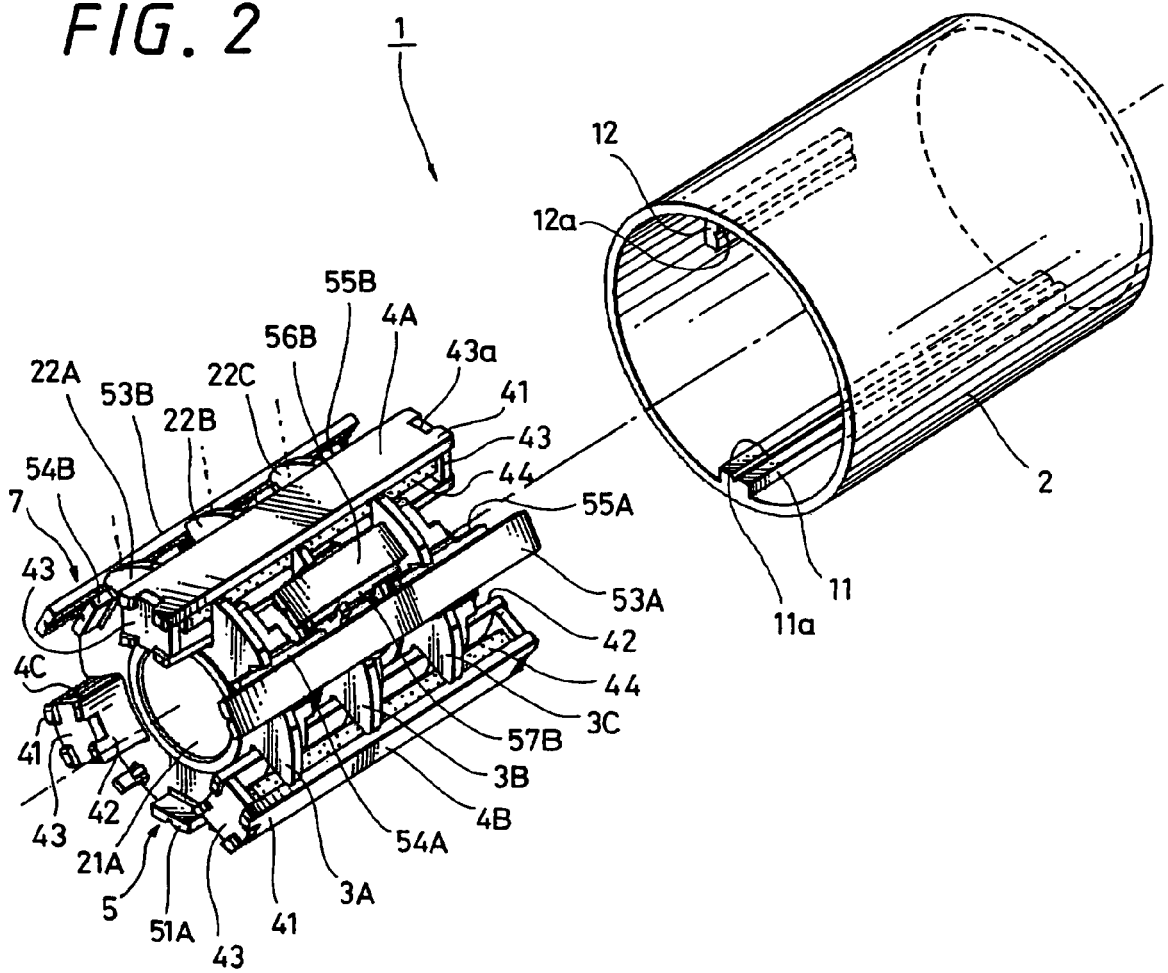
FIG. 2 is an explanatory diagram of the lens barrel device assembly shown in FIG. 1.

As shown in FIGS. 1 and 2, the barrel 2 is formed of a circular cylinder and includes a first reference rail portion 11 and a second reference rail portion 12 that are inwardly protruded from an inner circumferential surface thereof in the radial direction. The first reference rail portion 11 has a continuous profile from one end to the other of the barrel 2 in the axial direction, provided in parallel with the axial direction, and has a first guide groove 11a having a continuous profile in the axial direction provided in the approximately center of the inner surface. The first guide groove 11a is provided in parallel with the axial line of the barrel 2. Further, the first guide groove 11a has a V-shaped cross-sectional profile in the direction perpendicular to the axial direction of the first groove 11a, and the inclined planes of both sides thereof include an angle of an approximately 45°.

The second reference rail portion 12 is placed at the position rotated approximately 90° in the circumferential direction of the barrel 2 from the first reference rail portion 11. The second reference rail portion 12 is formed in the middle of the axial direction of the barrel 2 to be in parallel with the axial direction by a predetermined length (approximately ⅓ of the length of the barrel 2 in this embodiment). The second reference rail portion 12 includes a second guide groove 12a having a profile similar to that of the first guide groove 11a, which is a V-shaped cross-sectional profile inwardly protruded from an inner circumferential surface thereof.

As shown in FIG. 1, the three lens moving portions 3A, 3B, 3C has approximately similar profiles, and the first lens moving portion 3A, the second lens moving portion 3B, and the third lens moving portion 3B are located in the order from the front side of the barrel device. The first to third lens moving portions 3A, 3B, 3C include first to third lenses 21A, 21B, 21C (see FIG. 6) formed by bonding a plurality of lenses which are specific examples of optical parts, first to third lens holding frames 22A, 22B, 22C for holding the lenses and first to third coils 23A, 23B, 23C which are wound around the lens holding frames 22A to 22C.

The first lens holding frame 22A of the first lens moving portion 3A includes a cylindrical portion 31 for holding the first lens 21A and a flange portion 32 externally expanded in the radial direction from one end of the cylindrical portion 31. The cylindrical portion 31 has a circular inner diameter corresponding to the size of the first lens 21A, and the first coil 23A is circularly-wound around an outer circumference thereof in the circumferential direction, thereby obtaining the first lens moving portion 3A having the first coil 23A fitted on the outer circumference of the cylindrical portion 31 that holds the first lens 21A.

Figure 4:
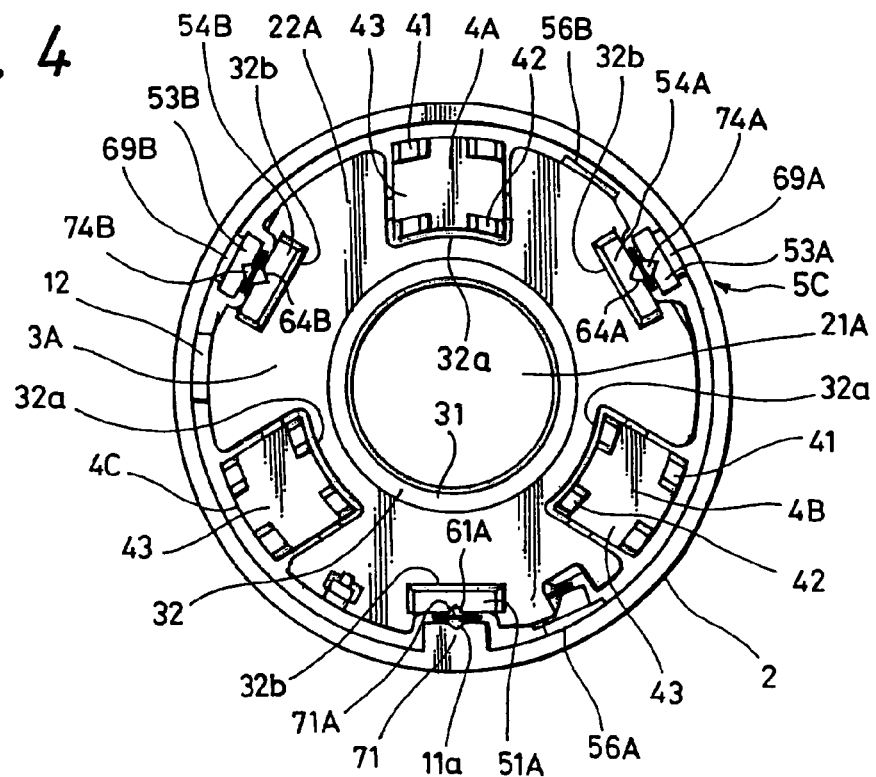
FIG. 4 is a front view of the lens barrel device shown in FIG. 1.

As shown in FIGS. 1 and 4, the flange portion 32 of the first lens moving portion 3A has an approximately circular profile and a lightly smaller size the internal diameter of the barrel 2. The flange portion 32 has three first slits 32a, 32a, 32a located at equal intervals of 120° (located at equal intervals in the circumferential direction) around the optical axis of the first lens 21A, and three second slits 32b, 32b, 32b similarly located at equal intervals of 120° in the outer circumference thereof. The three first slits 32a, 32a, 32a are approximately square in shape, respectively, and inner circumferences thereof extend to the periphery of the cylindrical portion 31, where three predetermined gaps into which facing yokes 42 are inserted are formed between the inner circumferences of the three first slits 32a of the flange portion 32 and the inner surface of the first coil 23A, as will be described later.

Moreover, the three second slits 32b, 32b, 32b of the flange portion 32 are respectively located with a predetermined angles α (approximately 60°) in the circumferential direction of the flange portion 32 shifted from the three first slits 32a, 32a, 32a, and each includes an approximately rectangular profile. Three guide plates 51A, 54A, 54B are respectively inserted into the three second slits 32b, 32b, 32b. The three guide plates 51A, 54A, 54B penetrate through the flange portion 32 in the optical axis direction of the lens and are secured on the flange portion 32 protruded from both surfaces with proper lengths.

Figure 7:
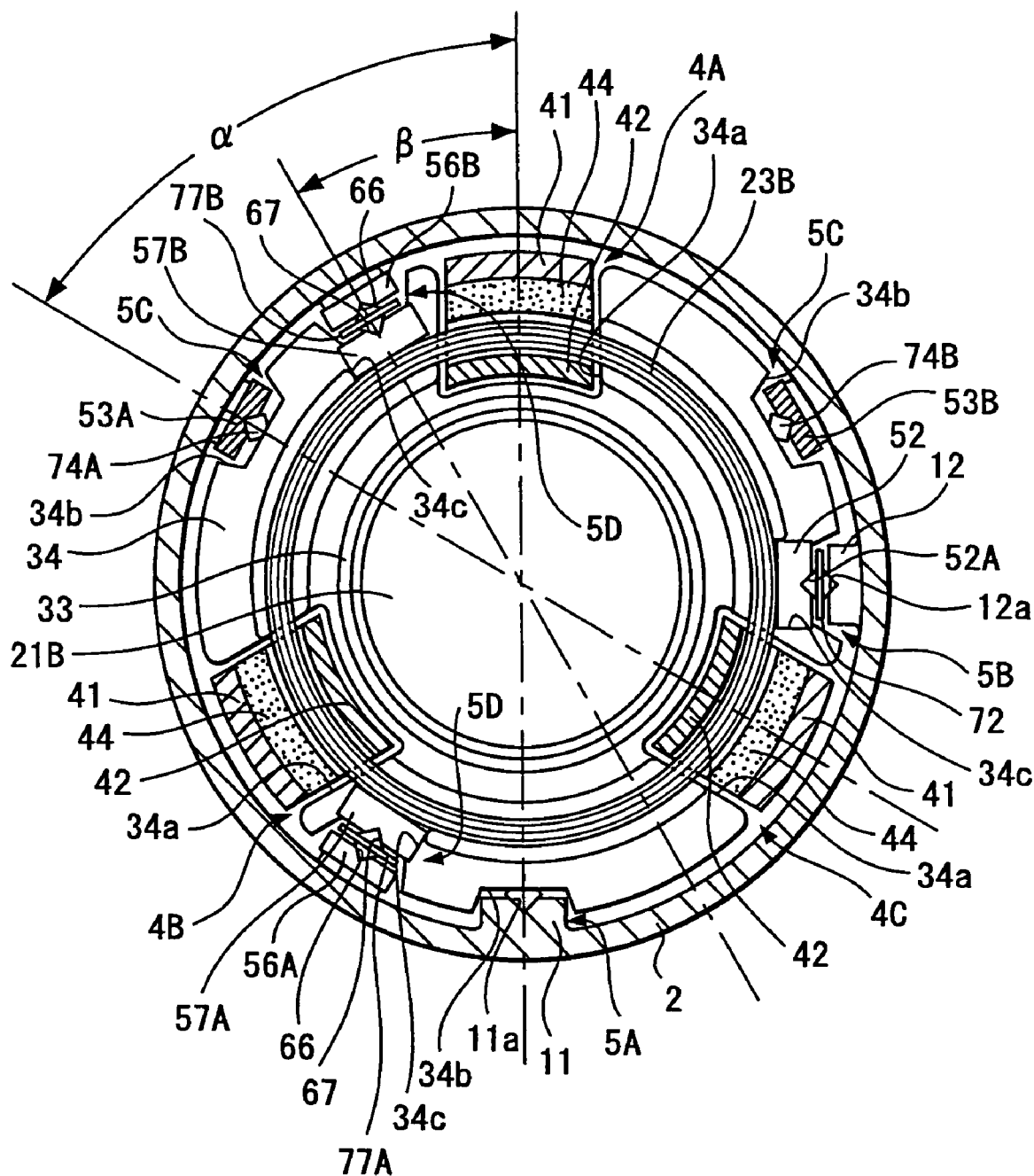
FIG. 7 is a cross-sectional view taken along the line X-X in FIG. 6.

As shown in FIGS. 1 and 7, the second lens holding frame 22B of the second lens moving portion 3B has a slightly different profile from that of the first lens holding frame 22A; while the second lens holding frame includes the cylindrical portion 33 holding the second lens 21B and the flange portion 34 provided at one end of the cylindrical portion 33 continuously expanded to the outside in the radial direction, as the first lens holding frame has, however, the second lens holding frame has different slits in the flange portion 34, differing from the first lens holding frame. The second coil 23B is annularly wound around the outer circumference of the cylindrical portion 33 of the second lens holding frame 22B in the circumferential direction. Accordingly, the second lens moving portion 3B includes the second coil 23B fitted on the outer circumference of the cylindrical portion 33 holding the second lens 21B.

The three first slits 34a, 34a, 34a, the three second slits 34b, 34b, 34b, and the three third slits 34c, 34c, 34c are respectively provided on the outer circumference of the flange portion 34 of the second lens holding frame 22B. The three first slits 34a, 34a, 34a are formed with the identical size and shape, at the positions the slits are mutually faced, corresponding to the three first slits 32a, 32a, 32a provided on the flange portion 32 of the first lens holding frame 22A. Specifically, the three first slits 34a are formed as recesses having approximately square and located at equal intervals (120°) in the circumferential direction.

While the three second slits 34b are located at the positions corresponding to the second slits 32b provided on the flange portion 32 of the first lens holding frame 22A, the application thereof will differ. Specifically, the three second slits 34b are escape grooves with which the first reference rail portion of the barrel 2 may not interfere with the two guide groove plates 53A, 53B, respectively. Upon assembly, the first reference rail portion 11 is inserted into one of the three second slits 34b with a non-contact state and the two guide groove plates 53A, 53B are inserted into the remaining two second slits 34b, 34b with a non-contact state. The three second slits 34b are respectively provided at corresponding positions shifted from the three first slits 34a predetermined angle α (approximately 60°) in the circumferential direction.

Further, while the three third slits 34c, 34c, 34c correspond to the three second slits 32b provided on the flange portion 32 of the first lens holding frame 22A, the setting positions thereof will be different. Specifically, the three third slits 34c are respectively located at the positions shifted from the three first slits 34a with predetermined angles β (approximately 30°) in the circumferential direction of the flange portion 34, and the three third slits 34c have approximately rectangular profiles. Three guide plates 52, 57A, 57B are respectively inserted into the three third slits 34c, 34c, 34c. The three guide plates 52, 57A, 57B penetrate through the flange portion 34 in the optical axis direction of the lens, and the three guide plates are secured on the flange portion 34 such that three guide plates may be projected from both surfaces with appropriate lengths.

Figure 5:
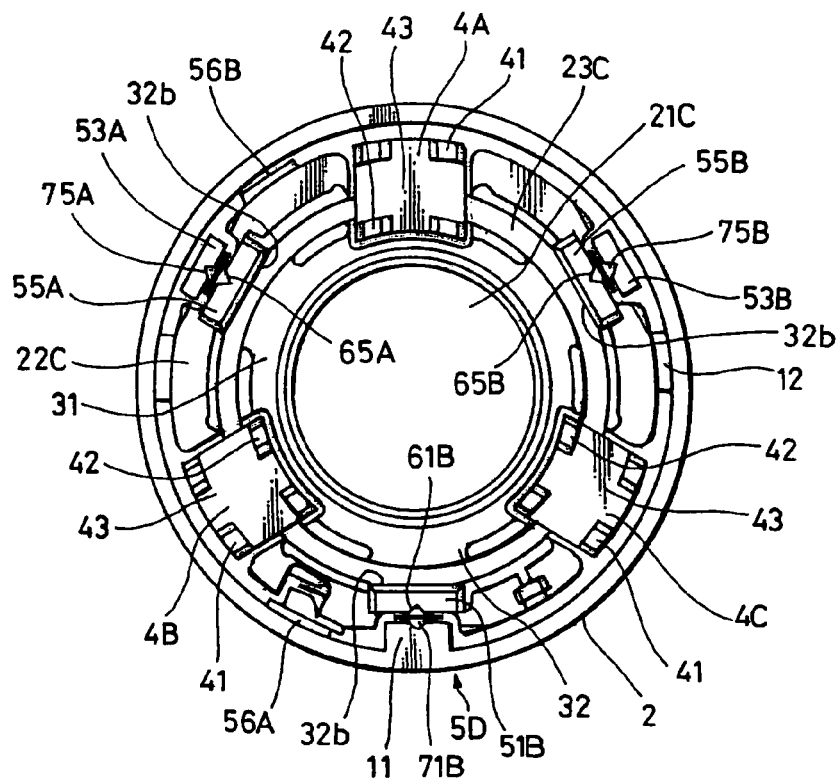
FIG. 5 is a rear view of the lens barrel device shown in FIG. 1.

As illustrated in FIGS. 1 and 5, the third lens holding frame 22C of the third lens moving portion 3C is identical to the first lens holding frame 22A, and includes the cylindrical portion 31 for holding the third lens 21C and the flange portion 32 formed as one with the cylindrical portion 31. The third coil 23C is annularly wound around the outer circumference of the cylindrical portion 31 in the circumferential direction, thereby having the third lens moving portion 3C with the third coil 23C fitted on the outer circumference of the cylindrical portion 31 holding the third lens 21C.

The three first slits 32a, 32a, 32a located at equal intervals of 120° around the optical axis of the third lens 21C (located at equal intervals in the circumferential direction), and the three second slits 32b, 32b, 32b similarly located at equal intervals of 120° are provided on the outer circumference of the flange portion 32 of the third lens holding frame 22C. The three first slits 32a are approximately square in shape and gaps into which the facing yokes 42 that will be described later on are inserted are formed between their inner circumferences and the inner surface of the third coil 23C.

The three second slits 32b are respectively located at the positions shifted from the three first slits 32a with predetermined angles α (approximately 60°) in the circumferential direction of the flange portion 32. Three guide plates 51B, 55A, 55B are respectively inserted into the three second slits 32b. The three guide plates 51B, 55A, 55B penetrate through the flange portion 32 in the optical axis direction of the lens and the three guide plates are secured on the flange portion 32 protruded from both surfaces with appropriate lengths.

The three lens moving portions 3A to 3C having the configurations are located within the barrel 2 in a state such that the optical axes of the three lenses 21A to 21C may converge. Within the barrel 2, the three magnetic circuit portions 4A, 4B, 4C are attached to the three lens moving portions 3A to 3C. The three magnetic circuit portions 4A, 4B, 4C have identical shape and structure, are inserted into the barrel 2 in the optical axis direction, and are located at equal intervals of angles (120°) in the circumferential direction.

Figure 6:
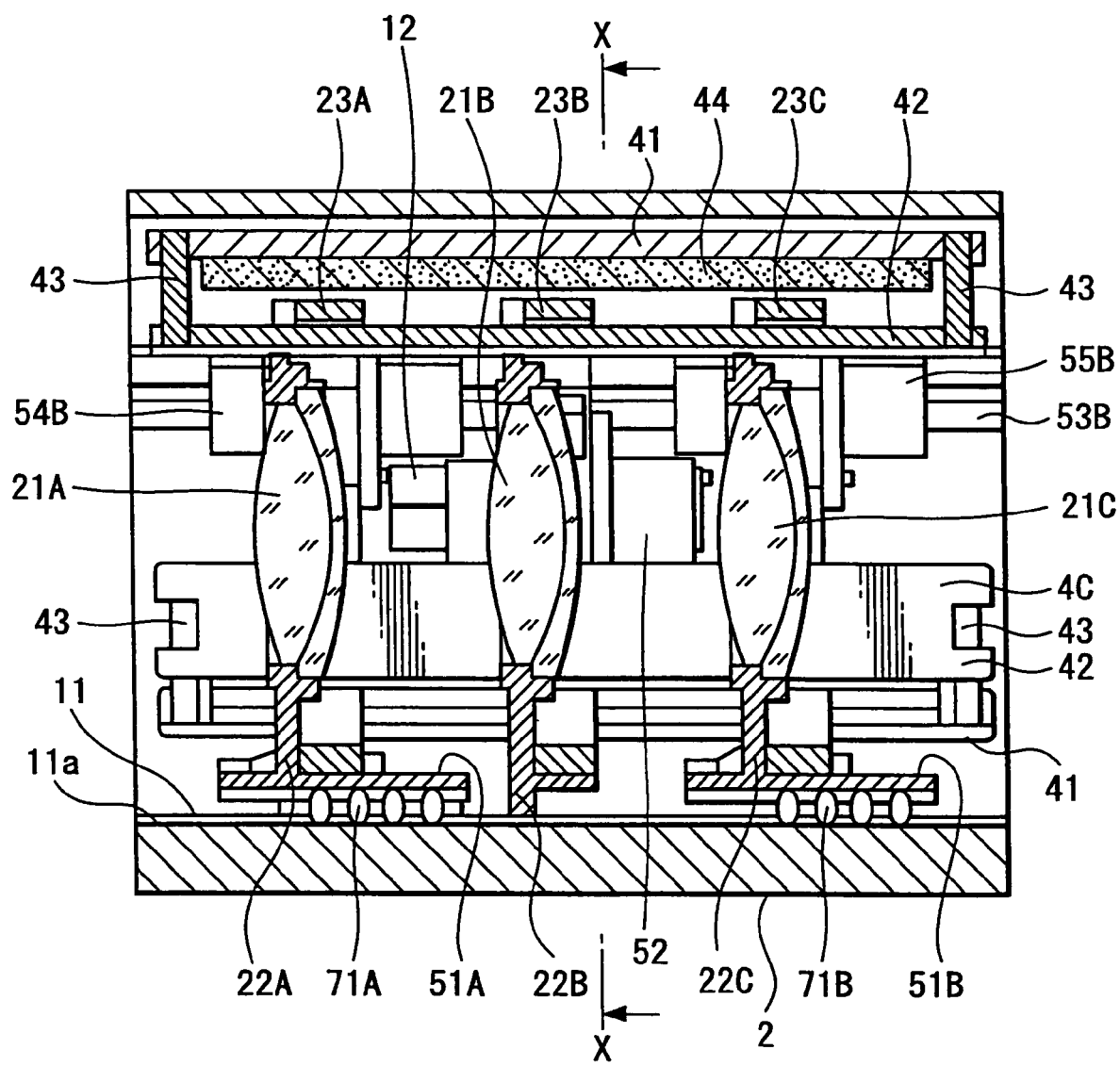
FIG. 6 is a cross-sectional view of the lens barrel device shown in FIG. 1 taken along the optical axis direction.

As shown in FIGS. 2 and 6, the first to third magnetic circuit portions 4A to 4C include ground yokes 41 located at the outside in the radial direction (inner surface side) within the barrel 2, facing yokes 42 internally faced with yokes 41, a pair of connection yokes 43, 43 for connecting both end portions of the ground yokes 41 and the facing yokes 42, and permanent magnets 44 fixed on the inner surfaces of the ground yokes 41.

The ground yoke 41 of each of the magnetic circuit portions 4A to 4C is formed of an approximately rectangular plate and includes engagement concave portions 41a, 41a formed in the approximately center of short sides of both end portions in the longitudinal direction. The facing yoke 42 has a similar shape as the ground yoke 41 and includes engagement concave portions 42a, 42a having similar shapes as the engagement concave portions 41a formed in the approximately center of short sides thereof. Also, the pair of connection yokes 43, 43 is formed of an approximately cross-shaped plate and includes engagement convex portions 43a, 43a respectively engaged with the engagement concave portions 41a of the ground yoke 41 and the engagement concave portions 42a of the facing yoke 42. The pair of connection yokes 43, 43 are attached such that the yokes connect both ends of the ground yoke 41 and the facing yoke 42 mutually located in parallel with a predetermined gap therebetween, thereby obtaining a magnetic circuit frame having an oblong shape.

The permanent magnet 44 of each of the magnetic circuit portions 4A to 4C have a flat plate with the length slightly smaller than that of the ground yoke 41 and secured on the surface of the ground yoke 41 facing the facing yoke 42 with a binding means such as an adhesive. The permanent magnet 44 is located at three positions within the barrel 2 and the first to third coils 23A to 23C having a ring-shape are inserted into gaps formed between the permanent magnets 44 and the facing yokes 42 facing the permanent magnets 44, respectively, as shown in FIG. 7. The ground yoke 41, the facing yoke 42 and the pair of connection yokes 43, 43 are made of a magnetic material such as pure ion and permalloy (Ni—Fe alloy). In the assembled state, a magnetic closed circuit is formed between the permanent magnet 44, the ground yoke 41, the facing yoke 42, and the pair of connection yokes 43, 43. The first to third coils 23A to 23C attached to the first to third lens moving portions 3A to 3C are respectively interposed between the lens moving portions 3A to 3C within the magnetic closed circuit.

The slide mechanism portion 5 includes a first slide portion 5A, a second slide portion 5B, a third slide portion 5C and a fourth slide portion 5D. The first slide portion 5A includes the first reference rail portion 11 provided on the inner circumferential surface of the barrel 2, two first guide plates 51A, 51B facing the first reference rail portion 11, two roller units 71A, 71B lying between the first guide plates 51A, 51B and reference rail portion 11, and like. Of the two first guide plates 51A, 51B, the first guide plate 51A is attached to the flange portion 32 of the first lens moving portion 3A and the first guide plate 51B is attached to the flange portion 32 of the third lens moving portion 3C.

The two first guide plates 51A, 51B are respectively formed of plate members of approximately rectangular shape and the guide grooves 61A, 61B are provided in the approximately centers of planes located at the outside in the radial direction of the flange portion 32 (see FIGS. 4 and 5) and have continuous profiles from one end to the other in the longitudinal direction. The guide grooves 61A, 61B, each has a V-shaped cross-sectional profile same as the first reference guide groove 11a of the first reference rail portion 11 in the direction perpendicular to the direction to which it is extended, so that the guide grooves 61A, 61B match the first reference guide groove 11a. Respective guide grooves 61A, 61B of the two first guide plates 51A, 51B face the first reference guide groove 11a and the roller units 71A, 71B are rotatably provided between the guide grooves.

The second slide portion 5B includes the second reference rail portion 12 provided on the inner circumferential surface of the barrel 2, the second guide plate 52 facing the second reference rail portion 12, a roller unit 72 placed between the second guide plate 52 and the second reference rail portion 12. The second guide plate 52 is attached to the flange portion 34 of the second lens moving portion 3B. The second guide plate 52 has a shape similar to that of the first guide plates 51A, 51B, and formed of a plate member with an approximately rectangular shape, and the a second reference guide groove 52A is provided in an approximately center of a plane located at the outside of the flange portion 34 in the radial direction (see FIG. 7) with a continuous profile from one end to the other in the longitudinal direction.

The second guide groove 52A has a V-shaped cross-sectional profile similar to the first reference guide groove 12a of the second reference rail portion 12 in the direction perpendicular to the direction to which it is extended so that the second guide groove 52A can match the first reference guide groove 12a. The guide groove 52A of the second guide plate 52 is placed to face the second reference guide groove 12a and the roller unit 72 is rotatably provided between the guide grooves.

The third slide portion 5C includes two third guide plates 53A, 53B, two fourth guide plates 54A, 54B and two fifth guide plates 55A, 55B facing the two third guide plates 53A, 53B, four roller units 74A, 74B and 75A, 75B placed between the fourth guide plates 54A, 54B, fifth guide plates 55A, 55B, and third guide plates 53A, 53B.

The two fourth guide plates 54A, 54B are attached to the flange portion 32 of the first lens moving portion 3A, and the two fifth guide plates 55A, 55B are attached to the flange portion 32 of the third lens moving portion 3C. The fourth guide plates 54A, 54B and the fifth guide plates 55A, 55B have similar shapes as those of the first guide plates 51A, 51B, and the guide grooves 64A, 64B and guide grooves 65A, 65B having V-shaped cross-sectional profiles continuously formed from one end to the other in the longitudinal direction (see FIG. 7) are provided in the approximately center of the planes located at the outside in the radial direction of the flange portion 32.

In contrast, each of the two third guide plates 53A, 53B is formed of an approximately rectangular elongated plate member and the length thereof is approximately equal to that of the barrel 2 in the axial direction. The two third guide plates 53A, 53B are located within the barrel 2 such that the two third guide plates 53A, 53B are provided on the outside thereof in the radial directions to face the fourth guide plates 54A, 54B and the fifth guide plates 55A, 55B with a predetermined gap. The third guide plates 53A, 53B include the guide grooves 63A, 63B each having a continuous profile from one end to the other in the longitudinal direction provided in the approximately center of one surfaces of the third guide plates 53A, 53B. Each of the guide grooves 63A, 63B has a V-shaped cross-sectional profile similar to that of the first reference guide groove 11a in the direction perpendicular to the longitudinal direction.

The guide grooves 64A, 64B of the two fourth guide plates 54A, 54B and the guide grooves 65A, 65B of the two fifth guide plates 55A, 55B are mutually faced the guide grooves 63A, 63B of the two third guide plates 53A, 53B with predetermined gaps in the axial direction of the barrel 2. The roller units 74A, 74B are rotatably provided between the guide grooves 63A, 63B of the third guide plates 53A, 53B, and the guide grooves 64A, 64B of the first lens moving portion 3A, and the roller units 75A, 75B are rotatably provided between the guide grooves 63A, 63B and the guide grooves 65A, 65B of the third lens moving portion 3C.

Figure 8:
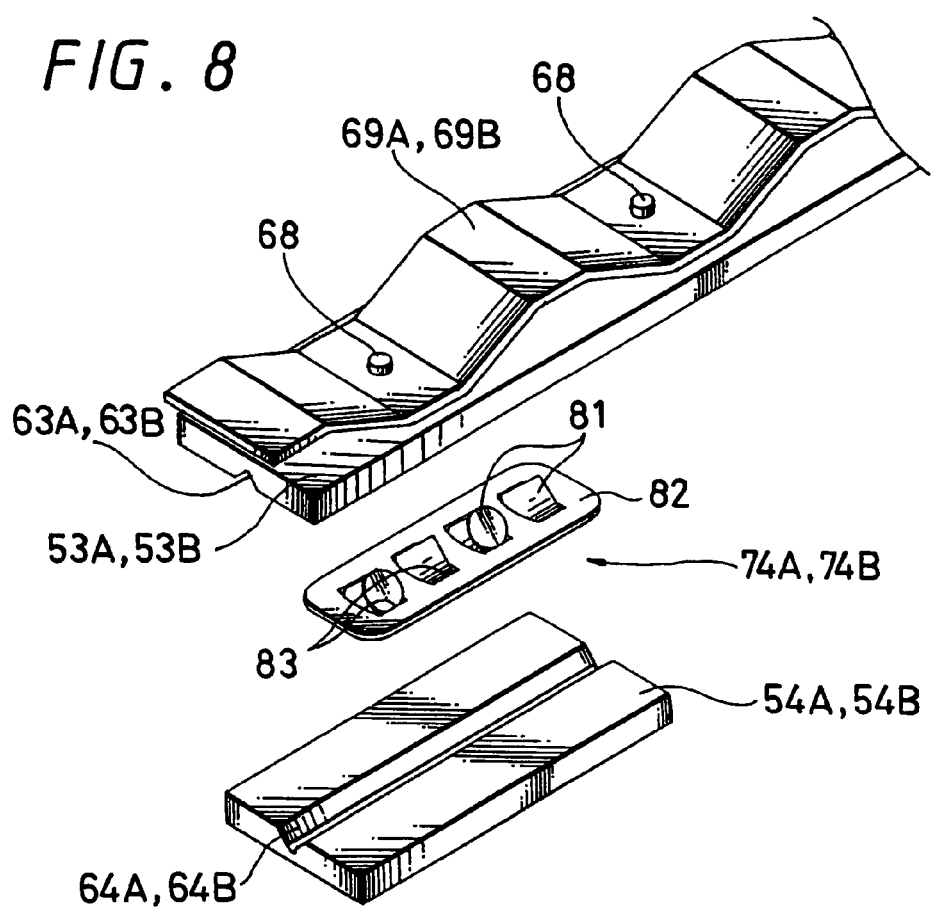
FIG. 8 is an explanatory diagram of a slide mechanism portion of the lens barrel device shown in FIG. 1.

Further, a plurality of fitting pins 68 are provided in the opposite surface of the guide grooves 63A, 63B of the two third guide plates 53A, 53B with predetermined gaps in the longitudinal direction as shown in FIG. 8. A plurality of fitting pins 68 are provided in the approximately center of the third guide plates 53A, 53B in the width direction, and two leaf springs 69A, 69B showing one specific example of preloading members are attached to one surfaces of the third guide plates 53A, 53B with the fitting pins 68.

The two leaf springs 69A, 69B are made of rectangular thin spring steel and the lengths thereof are equal to those of the third guide plates 53A, 53B using the characteristics of a thin spring steel. A plurality of fitting holes are provided in the approximately center of the leaf springs 69A, 69B in the width direction having a predetermined distance in the longitudinal direction. A plurality of fitting holes correspond to a plurality of fitting pins provided in the two third guide plates 53A, 53B and the two leaf springs 69A, 69B are detachably attached the third guide plates 53A, 53B by fitting the fitting pins 68 into the fitting holes.

The fourth slide portion 5D includes two seventh guide plates 57A, 57B facing the sixth guide plates 56A, 56B, and two roller units 77A, 77B placed between the seventh guide plates 57A, 57B and sixth guide plates 56A, 56Be, respectively. The two seventh guide plates 57A, 57B are each attached to the flange portion 34 of the second lens moving portion 3B. The two seventh guide plates 57A, 57B have similar shapes as those of the first guide plates 51A, 51B, and guide grooves 67, 67 having V-shaped cross-sectional profiles continuously formed from one end to the other in the longitudinal direction are provided on the outside of the flange portion 34 in the approximately center of the plane located in the radial direction (see FIG. 1).

In contrast, the two sixth guide plates 56A, 56B include configurations similar to those of the third guide plates 51A, 51B and the lengths thereof are equal to that of the second reference rail portion 12 of the barrel 2 (about approximately ⅓ of the length of the barrel 2 in the embodiment). Guide grooves 66, 66 having V-shaped cross-sectional profiles provided in the surfaces of the sixth guide plates 56A, 56B facing the seventh guide plates 57A, 57B (see FIG. 1). The roller units 77A, 77B are rotatably provided between the guide grooves 66, 66 of the sixth guide plates 56A, 56B and the guide grooves 67, 67 of the seventh guide plates 57A, 57B, respectively.

Further, a plurality of fitting pins are fitted in the opposite side of the guide groove 66 of the two sixth guide plates 56A, 56B with predetermined distances in the longitudinal direction. The fitting pins are provided in the approximately center of the sixth guide plates 56A, 56B in the width direction. Leaf springs showing one specific example of preloading members (not shown) are detachably attached to one surface of the sixth guide plates 56A, 56B with the fitting pins. The leaf springs have configurations similar to those of the two leaf springs 69A, 69B and have lengths equal to those of the third guide plates 53A, 53B using the characteristics of the rectangular thin spring steel.

The nine roller units 71A, 71B, 72, 74A, 74B, 75A, 75B, 77A, 77B all have an identical shape and structure, and include a plurality of cylindrical rollers 81 (four cylindrical rollers in the embodiment) and a retainer 82 rotatably retaining the cylindrical rollers 81. The cylindrical roller 81 can suitably used as a roller; however, other rollers such as spherical rollers and balls may also be used as the cylindrical rollers. Four retaining holes 83 are linearly provided in the retainer 82 corresponding to the same number of rollers to accommodate the cylindrical rollers 81 therein. The four cylindrical rollers 81 are rotatably retained in the four retaining holes 83 such that the inclinational directions of the four cylindrical rollers 81 are alternately changed 45°.

The first to third lens moving portions 3A to 3C having the aforementioned configuration can be moved in the optical axis directions of the first to third lenses 21A to 21C within the barrel 2 controlled by a control device (not shown). Such control device includes a microcomputer which stores a predetermined control system in a memory device in advance. Thus, control signals are optionally output to the first to third lens moving portions 3A to 3C from the control device, by which magnitudes or duration of voltages applied to the coils 23A to 23C are controlled to move the first to third lens moving portions 3A to 3C to arbitrary distances in the optical axis directions.

The lens barrel device 1 having the above configuration can simply be assembled as follows, for example. First, as shown in FIG. 1, the first to third coils 23A to 23B are respectively wound around and attached to the three lens holding frames 22A to 22C having the first to third lenses 21A to 21C. The first to third lens moving portions 3A to 3C are assembled, accordingly.

Next, the first guide plate 51A and the two fourth guide plates 54A, 54B are fitted into the three second slits 32b provided in the flange portion 32 of the first lens holding frame 22A of the first lens moving portion 3A. Likewise, the second guide plate 52 and the two seventh guide plates 57A, 57B are fitted into the three third slits 34c provided in the flange portion 34 of the second lens holding frame 22B of the second lens moving portion 3B. Then, the first guide plate 51B and the two fifth guide plates 55A, 55B are fitted into the three second slits 32b provided in the third lens holding frame 22C of the third lens moving portion 3C.

Next, the first to third lens moving portions 3A to 3C are serially aligned such that optical axes of the first to third lenses 21A to 21C can converge on one optical axis direction; and the circumferential directions of the first slits 32a, 34a are adjusted to such that the first slits 32a, 34a provided on the respective flange portions 32, 34 can be linearly aligned at three portions in the optical axis directions. Then, the three facing yokes 42 are respectively inserted into the three first slits 32a, 34a of the three lens moving portions 3A to 3C located in the straight lines, and the facing yokes 42 are respectively penetrated through the gaps formed between the bases of the first slits 32a, 34a and the respective coils 23A to 23C attached to the cylindrical portions 31, 33.

Next, one engagement convex portions 43a of the connection yokes 43 are engaged with the engagement concave portions 42a, 42a provided at both ends of the three facing yokes 42 and the respective connection yokes 43 are assembled with the facing yokes 42. Subsequently, the three ground yokes 41 provided with the permanent magnets 44 in advance face the facing yokes 42, and in the state, the engagement concave portions 41a, 41a of the ground yokes 41 are respectively engaged with the other engagement convex portions 43a of the respective connection yokes 43. The three magnetic circuit portions 4A to 4C are assembled, accordingly. The magnetic circuit portions 4A to 4C assembled are used as common parts for the respective lens moving portions 3A to 3C.

The magnetic circuit portions 4A to 4C assembled as described above include magnetic closed circuits formed between the permanent magnet 44, the ground yoke 41, the pair of connection yokes 43, 43 and the facing yoke 42, and the three coils 23A to 23C are inserted into the magnetic closed circuits, thereby forming holding frame driving means linearly moving the first to third lens moving portions 3A to 3C in the optical axis directions of to the lenses 21A to 21C.

Thus, when the first to third coils 23A to 23C are conducted, electromagnetic force controlled based on a direction of an electric current flow, and a magnitude of a voltage is generated in the magnetic circuit portions 4A to 4C, respectively. Accordingly, driving force is generated in the first to third lens moving portions 3A to 3C in the optical axis direction, so that the respective lenses 21A to 21C can be moved in desired directions.

Next, the roller units 71A, 71B are respectively fitted into the respective guide grooves 61A, 61B of the two first guide plates 51A, 51B. Likewise, the roller unit 72 is fitted into the guide groove 52A of the second guide plate 52, the roller units 74A, 74B are fitted into the respective guide grooves 64A, 64B of the two fourth guide plates 54A, 54B, and the roller units 75A, 75B are fitted into the respective guide grooves 65A, 65B of the two fifth guide plates 55A, 55B. The roller units 74A, 74B are then fitted into the respective guide grooves 66, 66 of the two sixth guide plates 56A, 56B, and the roller units 77A, 77B are fitted into the respective guide grooves 67A, 67B of the two seventh guide plates 57A, 57B.

Next, the third guide plates 53A fixed with the leaf springs 69A in advance are superposed on the fourth guide plates 54A and the fifth guide plates 55A, and the guide grooves 63A are fitted into the two roller units 74A, 75A. Likewise, the third guide plates 53B fixed with the leaf springs 69B in advance are superposed on the fourth guide plate 54B and the fifth guide plate 55B, and the guide grooves 63B are fitted into the two roller units 74B, 75B. Next, the sixth guide plate 56A fixed with a leaf spring (not shown) in advance is superposed on the seventh guide plate 57A, and the guide groove thereof 56A is fitted into the roller unit 77A. In a similar manner, the sixth guide plate 56B fixed with a leaf spring (not shown) in advance is superposed on the seventh guide plate 57B, and the guide groove thereof 56B is fitted into the roller unit 77B. Thus, as shown in FIG. 2, the lens-side assembly 7 using parts other than the barrel 2 is formed.

Accordingly, the positions of the second guide plate 52 and the two seventh guide plates 57A, 57B attached to the second lens moving portion 3B are shifted approximately 30° in the circumferential direction of the lens holding frame 22B to face the first guide plate 51A and the two fourth guide plates 54A, 54B attached to the first lens moving portion 3A, and to face the first guide plate 51B and the two fifth guide plates 55A, 55B attached to the third lens moving portion 3C.

Next, the lens-side assembly 7 is inserted into the lens barrel device 2. First, the position of the whole of the lens-side assembly 7 is adjusted such that the roller unit 71B fitted into the guide groove 61B of the first guide plate 51B of the third lens moving portion 3C may face the first guide groove 11a of the first reference rail portion 11 of the barrel 2. Simultaneously, if the roller unit 71B is allowed to face the first guide groove 11a, the roller unit 72 fitted into the guide groove 52A of the second guide plate 52 facing the second guide groove 12a of the second reference rail portion 12 of the barrel 2.

Figure 3:
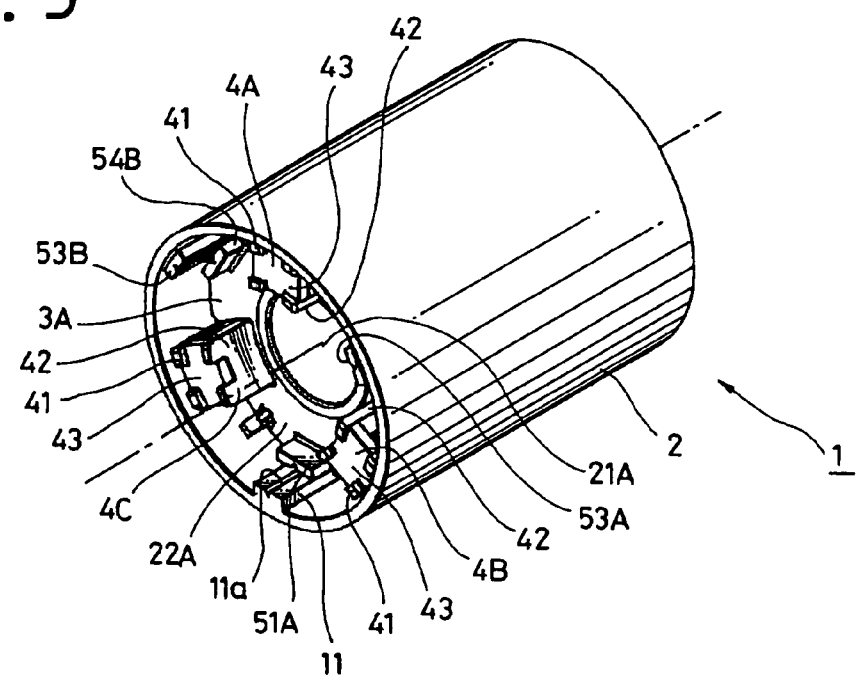
FIG. 3 is a perspective view showing the assembly of the lens barrel device shown in FIG. 1.

Subsequently, when the assembly is inserted into the lens barrel device, the roller unit 71B fitted into the guide groove 61B of the first guide plate 51B is fitted into the first guide groove 11a of the first reference rail portion 11, and slidably guided by the first guide groove 11a. If the lens-side assembly 7 is continuously inserted into the lens barrel device from the state, the roller unit 72 fitted into the guide groove 52A of the second guide plate 52 is fitted into the second guide groove 12a of the second reference rail portion 12 and slidably guided by the second guide groove 12a. If the lens-side assembly 7 is further inserted into the lens barrel device, the roller unit 71A fitted into the guide groove 61A of the first guide plate 51A is fitted into the first guide groove 11a of the first reference rail portion 11 and slidably guided by the first guide groove 11a. Then, the lens-side assembly 7 is inserted into the predetermined position. Accordingly, the lens barrel device 1 having the lens-side assembly 7 and the barrel 2 is formed, as shown in FIG. 3.

In this case, the first leaf spring 69A fixed to the third guide plate 53A is provided in contact with the inner surface of the barrel 2, and the third guide plate 53A biased to the fourth guide plate 54A and the fifth guide plate 55A with spring force thereof. Likewise, the third guide plate 53B is biased to the fourth guide plate 54B and the fifth guide plate 55B with spring force of the second leaf spring 69B. Further, the two sixth guide plates 56A, 56B are respectively biased to the seventh guide plates 57A, 57B with spring force of two leaf springs, though not shown in the drawings.

Next, yoke fixing members, not shown, are attached to the respective connection yokes 43 located at both ends in the longitudinal direction of the first to third magnetic circuit portions 4A to 4C of the lens barrel device 1 to fix the lens barrel device 1 to such as a camera body that will be described later. At that time, the respective magnetic circuit portions 4A to 4C are fixed to the first slits 32a, 34a of the first to third lens moving portions 3A to 3C with predetermined gaps therebetween (see FIGS. 4 to 7). Further, since the first to third coils 23A to 23C are not in contact with the respective facing yokes 42 and the respective permanent magnets 44 (see FIG. 6), the first to third lens moving portions 3A to 3C can move in the lens optical axis directions. Hence, the assembling is completed.

The barrel 2 of the lens barrel device 1 is provided with position detecting sensors showing one specific example of holding frame position detecting means to separately detect the positions of the first to, third lenses 21A to 21C through the first to third lens moving portions 3A to 3C, although not shown in the drawings. Examples of the position detecting sensor include a magnetic sensor and a magnetic scale, for example. The magnetic scale is attached to the inner surface of the barrel 2 extended from one end to the other in the axial direction, and the magnetic sensors are respectively attached to the lens holding frames 22A to 22C of the respective lens moving portions 3A to 3C. Thus, since the positions of the lens moving portions 3A to 3C can accurately be detected, the first to third lens moving portions 3A to 3C can be controlled and move in a more accurate manner.

Although the lenses 21A to 21C are used as the optical parts in the embodiment of the present invention, the optical parts of the present embodiment is not limited thereto; and an iris, a shutter, a ND (Neutral Density) filter, and like can be used as the optical parts. Accordingly, the optical parts holding frames for holding the optical parts are not limited to the lens holding frames 22A to 22C; and when the iris is used, the optical parts holding frame is used as an iris holding frame; when the shutter is used, the optical parts holding frame is used as a shutter holding frame; and when the ND filter is used, the optical parts holding frame is used as a filter holding frame. In this case, respective holding frames are not limited to indicating corresponding optical parts. For example, in the case of the iris and the iris holding frame, the holding frame may include combinations of lenses and other optical parts in addition to the iris and the iris holding frame.

Further, while the barrel device includes the three magnetic circuit portions (magnetic circuit portions 4A to 4C) in the embodiment of the present invention, the barrel device according to the embodiment of the present invention may include at least one magnetic circuit portion or two magnetic circuit portions; however, the present embodiment may preferably include at least three magnetic circuit portions in view of balance of magnetic attractions. Further, while the leaf spring is used as the preloading member in the embodiment of the present invention, the preloading member may not be limited to the leaf spring; and a rubber-like elastic body and a coil spring may also be used as the preloading member. It should be noted that, when a coil spring is used as a preloading member, coil springs may preferably be located on the guide plates 53A, 53B, 56A, 56B at equal intervals in the longitudinal directions such that preloads may be approximately equally applied to the two third guide plates 53A, 53B and the two sixth guide plates 56A, 56B.

According to the lens barrel device 1 having the above configuration, electromagnetic force is generated by conducting the respective coils 23A to 23C of the first to third lens moving portions 3A to 3C. Accordingly, the first to third lens moving portions 3A to 3C may be moved either independently or concurrently within the barrel 2 in a range of predetermined distances. In addition, since the magnetic circuit portions 4A to 4C are used as common parts for the coils 23A to 23C and have the lengths including a movable ranges of the first to third lens moving portions 3A to 3C, magnetic circuit portions need not be provided individually for the respective lens moving portions 3A to 3C, the number of parts may be decreased and the entire size of the device may also be reduced.

Further, since the positions of the second guide plates 52 and the seventh guide plates 57A, 57B attached to the second lens moving portion 3B are shifted (shifted approximately 30° in the circumferential direction) from the first guide plate 51A and the fourth guide plates 54A, 54B attached to the first lens moving portion 3A and the first guide plate 51B and the fifth guide plates 55A, 55B attached to the third lens moving portion 3C, the respective guide plates attached to the adjacent lens moving portions may alternately be fitted with one another. Thus, the adjacent lens moving portions, or the first lens moving portion 3A and the third lens moving portion 3C may be located more closely with one another, so that the length of the barrel in the axial direction may be within a necessary range.

Further, as shown in FIG. 4, the first lens moving portion 3A is located relative to the barrel 2 in the roller unit 71A of the first slide portion 5A and suitable preloads are applied to the roller units 74A, 74B using the third guide plates 53A, 53B and the leaf springs 69A, 69B in the two third slide portions 5C. Accordingly, pressures applied to the first lens moving portion 3A may be balanced. Specifically, since the roller units 71A, 74A, 74B are located on the outer circumference of the first lens holding frame 22A at equal intervals (located at equal intervals of 120° around the optical axis), preloads applied to the three roller units 71A, 74A, 74B may approximately be uniform by applying spring force of the leaf springs 69A, 69B from the two directions. As a result, backlashes caused by dimensional errors of respective parts and errors of attachment accuracy may be absorbed and hence the first lens moving portion 3A may be moved precisely without any interruption. Such action and effects may also be achieved in the second lens moving portion 3B and the third lens moving portion 3C.

Figure 9:
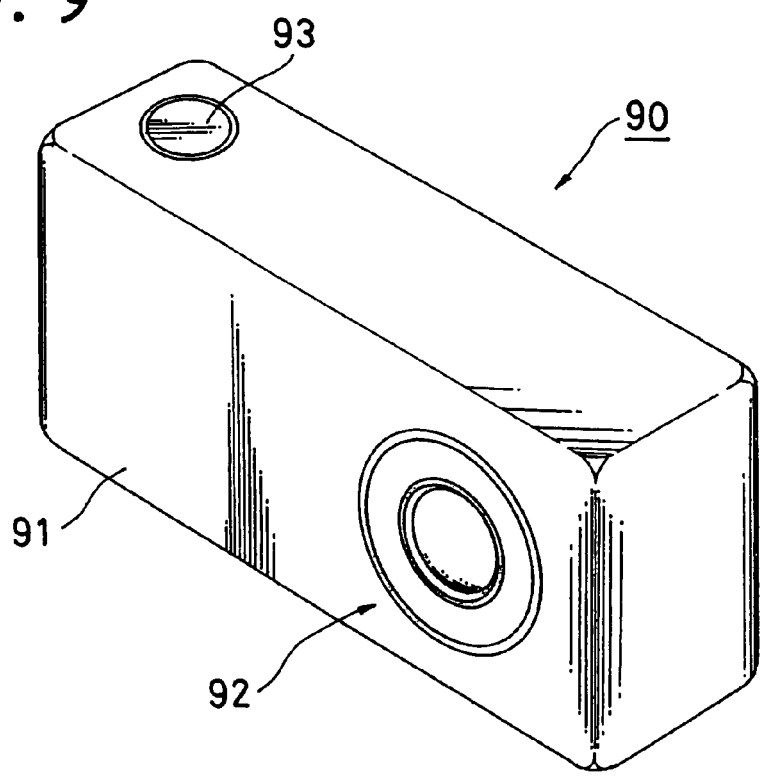
FIG. 9 is an external perspective view showing an embodiment of an image capture device that includes the lens barrel device shown in FIG. 1.

FIG. 9 is a diagram showing a digital still camera 90 showing one specific example of an image capture device using the lens barrel device 1 having the aforementioned configuration. The digital still camera 90 includes a camera body 91 showing one specific example of an image capture device body. The camera body 91 is formed of an oblong case inside of which a space is provided, and a lens device 92 is located at one side of the camera body 91 in the lateral direction that corresponds to the longitudinal direction (right-hand side to the image capture device in the embodiment of the present invention). A CCD (solid-state image pickup device) showing one specific example of an imaging means is located behind the optical axis of the lens device 92.

A shutter release button 93 for imaging a subject image is provided on the top surface of the camera body 91. Further, the camera body 91 includes a power supply button, a mode selection dial, a liquid-crystal display (LCD) showing one specific example of a display device, an electronic viewfinder, a flash device, and like, although not shown in the drawings. The camera body 91 incorporates a wiring board on which various electronic components are mounted, a battery power supply, a memory device, various electronic components and mechanical parts, and like, although not shown in the drawings.

When the lens barrel device according to the embodiment of the present invention is applied to the digital still camera 90 having the above configuration, a plurality of lenses may be moved without any obstacles and with high accuracy, and the lens device 92 may be reduced in size, thereby achieving to reduce the size of the camera body.

As described above, according to the embodiments of the present invention, since the coil is wound around the optical parts holding frame to be concentric around the optical axis of the optical parts, part of the barrel may not be necessarily increased for acquiring a larger external form for arranging a coil and a magnetic circuit portion therein, thereby achieving to reduce the size of the barrel device.

In addition, since the holding frame driving means for moving the optical parts holding frame uses electromagnetic force generated when a combination of the coil and the magnetic circuit portion is used, a motor with a large torque, and like need not be used and the optical parts holding frame may be moved with a small amount of electric power. Further, since the barrel device of the present invention has a structure in which the optical parts holding frame is not moved by rotating a cam cylinder, and the like but has the structure in which the optical parts holding frame can be moved linearly, a lens barrel device having cross-sectional profiles perpendicular to the optical axis direction are a square and an oval, and like may be achieved, and hence it is possible to design an image capture device without any restriction. In addition, the image capture device has no restrictions for designing of cam grooves, and the like, thereby improving a design efficiency of optical design.

Further, since preload applied to a plurality of roller units is approximately uniform to support the respective optical parts holding frames, it is possible to realize a lens barrel device having impact-resistance. Moreover, backlashes caused by size errors of respective parts and errors of attachment accuracy of parts may be absorbed, wobbles of image and image skip occurred in the lens can be controlled, and hence moving pictures may be recorded while zooming and focusing.

The present invention is not limited to the aforementioned embodiment shown in the sheets of drawings and can be variously modified without departing from the gist thereof. For example, while an example in which the digital still camera is applied to the image capture device has been described so far in the above-described embodiment, it is needless to say that the present invention can be applied to other still cameras, video cameras, personal computers with camera, mobile-phones with camera and other image capture device.

DESCRIPTION OF REFERENCE NUMERALS

1 . . . lens barrel device (barrel unit)
2 . . . barrel
3A, 3B, 3C . . . lens moving portion
4A, 4B, 4C . . . magnetic circuit portion
5 . . . slide mechanism portion
5A . . . first slide portion
5B . . . second slide portion
5C . . . third slide portion
5D . . . fourth slide portion
11 . . . first reference rail portion
11a . . . first guide groove
12 . . . second reference rail portion
12a . . . first guide groove 21A, 21B, 21C ... lens (optical parts)
22A, 22B, 22C ... lens holding frame (optical parts holding frame)
23A, 23B, 23C ... coil
41 ... ground yoke
42 ... facing yoke
43 ... connection yoke
44 ... permanent magnet
51A, 51B ... first guide plate
52 ... second guide plate
53A, 53B ... third guide plate
54A, 54B ... fourth guide plate
55A, 55B ... fifth guide plate
56A, 56B ... sixth guide plate
57A, 57B ... seventh guide plate
71A, 71B, 72, 74A, 74B, 75A, 75B, 77A, 77B ... roller units
90 ... electronic still camera (image capture device)
91 ... camera body (image capture device body)
92 ... lens device

The invention claimed is:

1. A lens barrel device comprising:
at least two optical parts holding frames for holding optical parts each having a plurality of first guide grooves extended in optical axis directions of the optical parts, and arranged mutually in parallel to one another;
a barrel having the at least two optical parts holding frames arranged in the optical axis direction and housing the at least two optical parts holding frames such that optical axes of the optical parts converge on one point, and including a plurality of second guide grooves allowed to face the plurality of first guide grooves; and
a plurality of roller units including a plurality of rollers rotatably provided between the first guide grooves and the second guide grooves, and slidably supporting the at least two optical parts holding frames at a plurality of places for the barrel, wherein
positions of the plurality of first guide grooves, the plurality of second guide grooves, and the plurality of roller units provided between the plurality of first guide grooves and the plurality of second guide grooves are shifted in the circumferential directions of the optical parts between adjacent optical parts holding frames of the at least two optical parts holding frames such that the plurality of first guide grooves, the plurality of second guide grooves, and the plurality of roller units are alternately fitted into one another.

2. A lens barrel device, according to claim 1, wherein
the optical parts include a lens, an iris, a shutter or a filter, and the optical parts holding frames include a lens holding frame, an iris holding frame, a shutter holding frame or a filter holding frame.

3. A lens barrel device, according to claim 1, wherein
the plurality of first guide grooves and the plurality of second guide grooves are located at equal intervals in the circumferential direction of the optical parts.

4. A lens barrel device, according to claim 1, wherein
the plurality of roller units provided between the plurality of first guide grooves and the plurality of second guide grooves are concentrically located around an optical axis.

5. A lens barrel device, according to claim 1, wherein
the plurality of first guide grooves and the plurality of second guide grooves are symmetrically located based on a first guide groove and a second guide groove.

6. A lens barrel device, according to claim 1, wherein
the plurality of roller units separately supporting the at least two optical parts holding frames are arranged such that the roller units are rotated and spirally shifted.

7. A lens barrel device, according to claim 1, wherein
the plurality of roller units individually supporting the at least two optical parts holding frames are arranged in a lattice such that respective roller units located in uneven-numbered optical parts holding frames are conformed with the direction parallel to the optical axis direction, and the respective roller units located in even-numbered optical parts holding frames being are conformed with the direction parallel to the optical axis direction.

8. A lens barrel device, according to claim 6 or claim 7, wherein
the second guide grooves are integrally formed with respective facing roller units located in the uneven-numbered optical parts holding frames, and the second guide grooves are integrally formed with respective facing roller units located in the even-numbered optical parts holding frames.

9. A lens barrel device, according to claim 1, wherein
each optical parts holding frame of the at least two optical parts holding frame includes a guide member provided between at least one roller unit of the plurality of roller units and the barrel, and a preloading member urging the guide member to the roller unit side to preload the roller unit.

10. A lens barrel device, according to claim 9, wherein
the preloading member includes a combination of at one or two of leaf springs, coil springs, and rubber-like elastic body.

11. A lens barrel device, according to claim 1, further comprising:
holding frame position detecting means for detecting positions of the at least two optical parts holding frames for the barrel in the optical axis direction and outputting detected signals.

12. A lens barrel device, according to claim 1, further comprising:
holding frame driving means for moving the at least two optical parts holding frames in the optical axis direction, wherein
the holding frame driving means includes a plurality of coils respectively fixed to the at least two optical parts holding frames and a magnetic circuit portion penetrating the plurality of coils and forming a magnetic closed circuit.

13. An image capture device comprising:
at least two optical parts holding frames for holding optical parts each having a plurality of first guide grooves extended in optical axis directions of the optical parts and arranged mutually in parallel to one another;
a barrel having the at least two optical parts holding frames arranged in the optical axis direction and housing the at least two optical parts holding frames such that optical axes of the optical parts converge on one point, and including a plurality of second guide grooves allowed to face the plurality of first guide grooves; and
a plurality of roller units including a plurality of rollers rotatably provided between the first guide grooves and the second guide grooves, and slidably supporting the at least two optical parts holding frames at a plurality of places for the barrel, wherein positions of the plurality of first guide grooves, the plurality of second guide grooves, and the plurality of roller units provided between the plurality of first guide grooves and the plurality of second guide grooves are shifted in the circumferential directions of the optical parts between adjacent optical parts holding frames of the at least two optical parts holding frames such that the plurality of first guide grooves, the plurality of second guide grooves, and the plurality of roller units are alternately fitted into one another.

* * * * *